United States Patent [19]

Munekata et al.

[11] Patent Number: 5,649,709

[45] Date of Patent: Jul. 22, 1997

[54] SHAFT SEAL WITH DUST SEALING LIP

[75] Inventors: Hideko Munekata; Takeshi Miura, both of Fukushima, Japan

[73] Assignee: NOK Corporation, Tokyo, Japan

[21] Appl. No.: 575,068

[22] Filed: Dec. 19, 1995

[30] Foreign Application Priority Data

Dec. 28, 1994 [JP] Japan ................................. 6-338521

[51] Int. Cl.⁶ ............................................... F16J 15/32
[52] U.S. Cl. ............................ 277/34; 277/152; 277/153
[58] Field of Search .............................. 277/34, 152, 153, 277/208

[56] References Cited

U.S. PATENT DOCUMENTS

| | | | |
|---|---|---|---|
| 3,455,564 | 7/1969 | Dega | 277/153 |
| 3,563,442 | 2/1971 | Kretchman | 277/208 |
| 4,155,560 | 5/1979 | Repella | 277/208 |
| 4,243,232 | 1/1981 | Repella | 277/37 |
| 4,357,026 | 11/1982 | Panchetti | 277/153 |
| 4,886,281 | 12/1989 | Ehrmann et al. | 277/47 |
| 4,964,647 | 10/1990 | Stephan | 277/153 |
| 5,271,629 | 12/1993 | Dahlhaus et al. | 277/152 |

FOREIGN PATENT DOCUMENTS

| | | | |
|---|---|---|---|
| 1286775 | 12/1962 | France | 277/208 |
| 6-28429 | 4/1994 | Japan . | |
| 2008693 | 6/1979 | United Kingdom . | |
| 2127110 | 4/1984 | United Kingdom . | |
| 2135405 | 8/1984 | United Kingdom . | |

*Primary Examiner*—Scott Cummings
*Attorney, Agent, or Firm*—Jacobson, Price, Holman & Stern, PLLC

[57] ABSTRACT

A shaft seal (20) suitable for use in automotive shock absorber. The shaft seal (20) includes an annular dust sealing member (36) having a dust sealing lip (56) and an auxiliary rib (60). The auxiliary rib (60) is configured to present a rounded profile (62) having the radius of curvature larger than the radius of curvature of the dust sealing lip (56). The dust sealing lip (56) supported by the auxiliary rib (60) sustains dust scraping action for a prolonged time period to effectively prevent ingress of dust and dirt.

4 Claims, 2 Drawing Sheets

5,649,709

SHAFT SEAL WITH DUST SEALING LIP

BACKGROUND OF THE INVENTION

1. Field of the Invention

The present invention relates to a fluid seal and, more particularly, to a shaft seal which may be suitably used in automotive shock absorbers and the like for sealing a reciprocating shaft which undergoes a substantial lateral thrust.

2. Description of the Prior Art

In an automotive shock absorber, the piston rod is sealed by a shaft seal with respect to the housing. The shaft seal includes a primary fluid sealing lip for sealing the oil side of the piston rod to prevent release of the hydraulic fluid contained in the housing. In most instances, the seal also includes a dust sealing lip for sealing the air side to protect the primary sealing lip from ingress of dust and dirt.

During operation of the shock absorber, the piston rod undergoes a substantial lateral thrust as the wheel hits a bump or when the automobile undergoes cornering. In particular, a severe lateral thrust is encountered in the MacPherson strut type suspension systems.

One of the problems which must be overcome in designing a shaft seal for shock absorber applications is to effectively prevent ingress of dust and dirt for a long period of time despite repeated lateral thrust.

Japanese Utility Model Kokai Publication No. 6-28429 discloses a shaft seal which is provided with an auxiliary dust sealing lip situated inwardly of the primary dust sealing lip. The auxiliary dust sealing lip is profiled in the form of an edge that functions to scrape incoming dust and dirt back to the air side.

The problem associated with the conventional shaft seal is that the auxiliary dust sealing lip undergoes a considerable wear so that the dust sealing function of the shaft seal is prematurely degraded.

It is therefore an object of the present invention to provide a shaft seal which is capable of providing a high degree of dust sealing capability for a long period of time.

SUMMARY OF THE INVENTION

According to the invention, a shaft seal includes a rigid annular casing for fluid tightly mounting to a housing, an annular elastomeric primary sealing member for sealing the oil side of a shaft, and an annular elastomeric dust sealing member for sealing the air side of the shaft. The dust sealing member includes an annular dust sealing lip and an annular auxiliary rib located axially inwardly of the dust sealing lip.

The feature of the invention is that the auxiliary rib is configured to present a rounded profile having the radius of curvature larger than the radius of curvature of the dust sealing lip.

The rounded profile of the auxiliary rib provides a wider contact area and improves lubrication to thereby reduce wear of the auxiliary rib. The auxiliary rib supports the dust sealing lip and assists the latter in following any shaft eccentricity due to lateral thrust. Accordingly, the dust scraping action of the dust sealing lip is sustained for a long period of time to effectively prevent ingress of dust and dirt.

These features and advantages of the invention, as well as other features and advantages thereof, will become apparent from the following description.

DESCRIPTION OF THE PREFERRED EMBODIMENT

Figure 1:
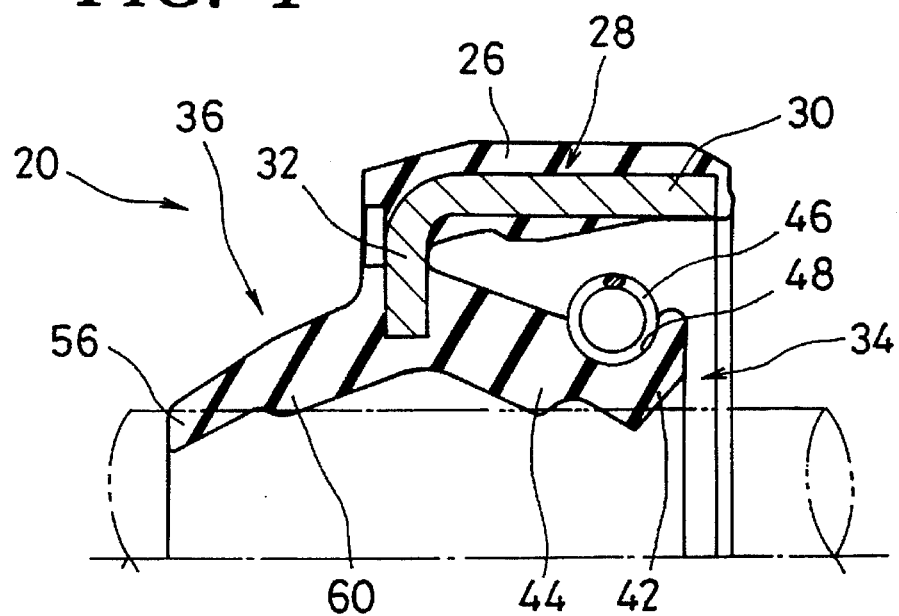
FIG. 1 is a fragmentary cross-sectional view showing a half of the shaft seal of the invention in the free state thereof.

Referring to the drawings, the shock absorber, designated generally by the reference numeral 10, may be of any conventional type and may include a housing or outer tube 12 in which an annular piston rod guide 14 is firmly secured in the conventional manner. The rod guide 14 has an axial bore 16 which slidably supports a piston rod 18 with a small clearance. The piston rod 18 is connected to a conventional valved piston, not shown. As the shock absorber 10 is of the conventional one, the structure thereof need not be described in any detail.

A shaft seal according to the invention, indicated generally by the reference numeral 20, is adapted to be fluid tightly mounted within the housing 12. In the illustrated exemplary embodiment, the shaft seal 20 may be fluid tightly and firmly sandwiched between a shoulder 22 of the rod guide 14 and a retaining cap 24 screwed into the threaded bore of the housing 12.

The shaft seal 20 includes an annular molded body 26 of an elastomeric material and an annular metallic casing 28 insert molded within the body 26. In the embodiment shown, the casing 28 has an L-shaped cross-section and includes an outer tubular portion 30 and a radial flange 32.

The shaft seal 20 further includes an annular elastomeric fluid sealing member 34 and an annular elastomeric dust sealing member 36 bonded, respectively, to the radial flange 32 of the casing 28. The fluid sealing member 34 serves to seal the oil side 38 of the piston rod 18 to prevent release of the hydraulic fluid contained within the housing 12. In contrast, the dust sealing member 36 is adapted to seal the air side 40 to prevent ingress of dust and dirt.

The fluid sealing member 34 may include in the conventional manner a primary sealing lip 42 and an auxiliary sealing lip 44. A garter spring 46 fitted in an annular groove 48 formed on the outer periphery of the sealing member 34 serves to apply compression force for bringing the fluid sealing lips 42 and 44 into fluid tight sealing engagement with the piston rod 18.

The dust sealing member 36 is generally frustoconical in shape and extends axially outwardly and radially inwardly from the radial flange 32 of the casing 28.

Figure 3:
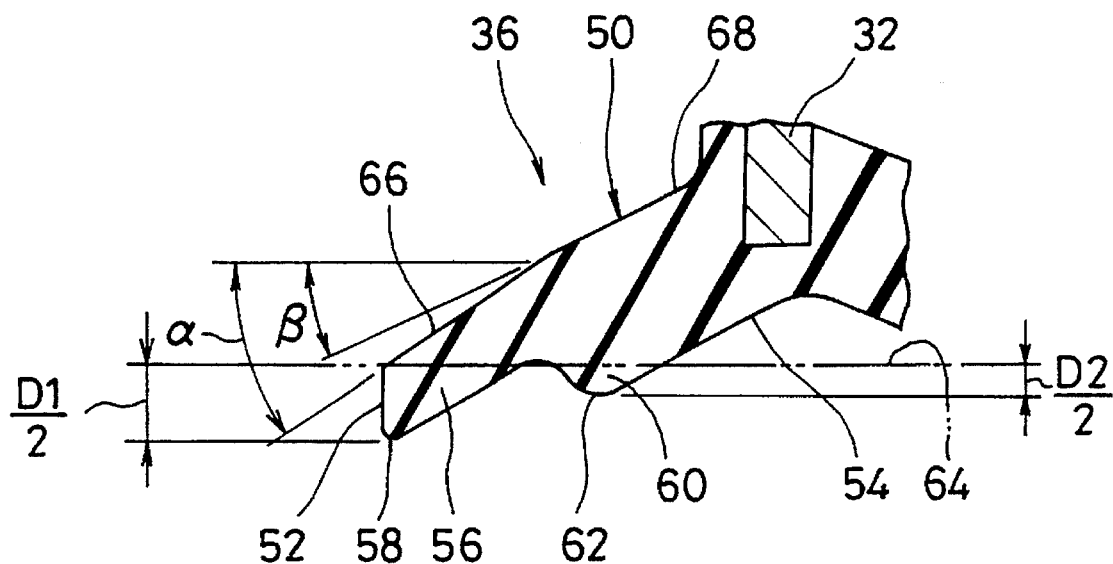
FIG. 3 is an enlarged fragmentary cross-sectional view showing in a greater scale the dust sealing member shown in FIG. 1; and, FIG. 4 is an enlarged fragmentary cross-sectional view showing in a greater scale the dust sealing member as brought into engagement with the shock absorber rod.

As shown enlarged in FIG. 3, the dust sealing member 36 is defined by a generally frustoconical outer surface 50, an end surface 52 and a generally frustoconical stepped inner surface 54. The end surface 52 and the inner surface 54 meet with each other at the rounded corner to define a dust sealing lip 56 having a rounded sealing edge 58. Preferably, the radius of curvature in the profile of the rounded edge 58 of the dust sealing lip 56 is about 0.2 mm.

The axially outer portion of the inner surface 54 is smoothly undercut to form an annular auxiliary rib 60 having a rounded profile 62. The radius of curvature of the rounded profile 62 of the auxiliary rib 60 is made larger than the radius of curvature in the profile of the rounded edge 58 of the dust sealing lip 56. Preferably, the radius of curvature in the profile of the auxiliary rib 60 is about 0.5 mm, in contrast to the radius of curvature of about 0.2 mm of the dust sealing lip 56.

As shown in FIG. 3, the dust sealing lip 56 and the auxiliary rib 60 are so sized and dimensioned that they are interference fitted over the outer surface 64 of the piston rod 18. Preferably, the interference D1 of the dust sealing lip 56 with respect to the piston rod 18 (the amount of diametral elastic deformation as the dust sealing lip 56 is interference fitted over the rod) is about 2.0 mm and the interference D2 of the auxiliary rib 60 is about 0.5 mm. In this regard, it will be noted that in FIG. 3 only a half of such diametral interference is indicated.

Referring further to FIG. 3, the outer profile of the dust sealing member 36 is configured such that the axially outer half 66 of the outer surface 50 forms with a line parallel to the axis of the piston rod 18 an angle alpha which is larger than an angle beta formed by the axially inner half 68 of the surface 50.

In use, the fluid sealing lips 42 and 44 are brought into sealing engagement with the piston rod 18 to fluid tightly seal the oil side 38 of the piston rod 18.

Figure 2:
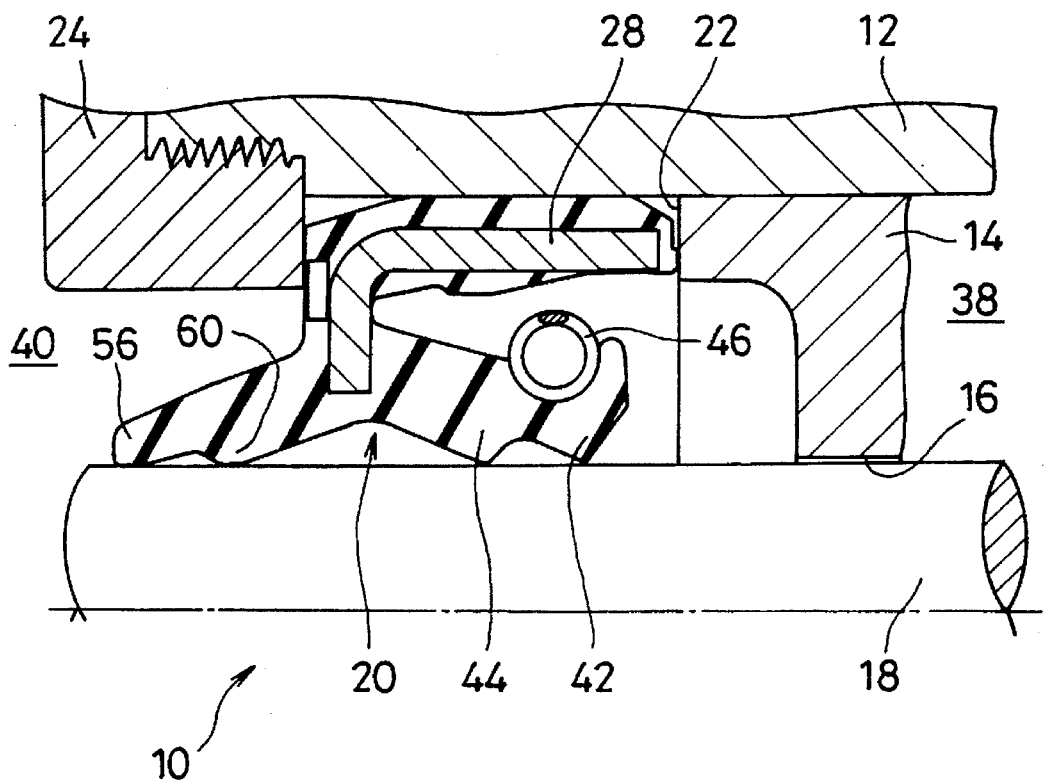
FIG. 2 is a fragmentary cross-sectional view showing the shaft seal of FIG. 1 as mounted to a shock absorber.
Figure 4:
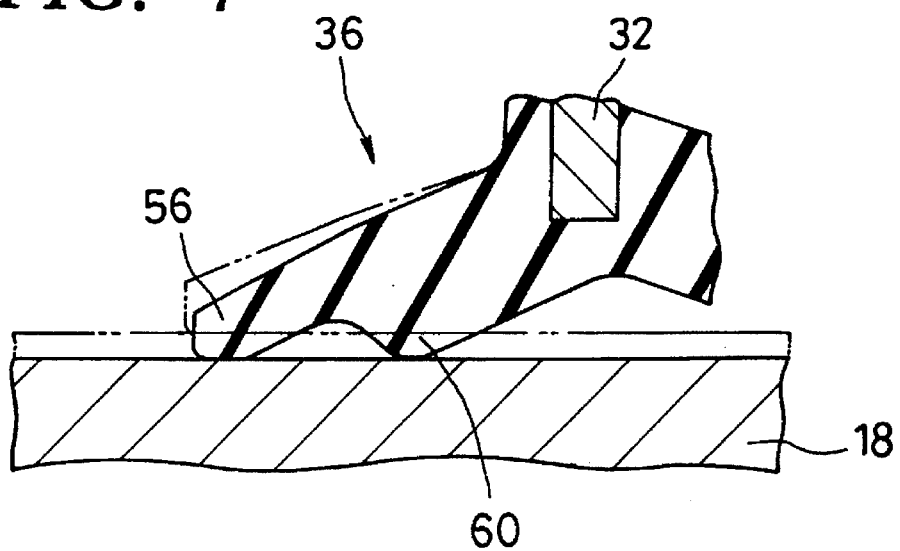

The dust sealing lip 56 and the auxiliary rib 60 are also brought into sealing engagement with the piston rod 18 as shown in FIGS. 2 and 4. The dust sealing lip 56 is brought in tight contact with the rod under a high sealing pressure as it is interference fitted with a relatively large interference. The scraping action of the dust sealing lip 56 effectively prevents ingress of dust and dirt as the edge 58 thereof has a relatively small radius of curvature and, hence, is somewhat sharpened.

The auxiliary rib 60 snugly engages with the piston rod for a sufficiently wide contact area as it has a rounded profile of a relatively large radius of curvature. In the event that the piston rod 18 is offset as shown in FIG. 4 by the imaginary line due to the lateral thrust exerted on the shock absorber 10, the auxiliary rib 60 which is in snug contact with the rod will cause the dust sealing member 36 to be resiliently deformed as shown thereby assisting the dust sealing lip 56 in following any eccentricity of the rod. This provides an even pressure distribution over the inner periphery of the dust sealing lip 56 so that the dust sealing lip 56 is engaged with the piston rod with a constant stable sealing pressure.

Due to the rounded profile, the scraping action of the auxiliary rib 60 is limited. This is advantageous in that a lubricant film of adequate thickness is retained over the piston rod to sufficiently lubricate the auxiliary rib 60 as well as the dust sealing lip 56. In addition, the rounded profile of the auxiliary rib 60 advantageously provides a sufficiently wide contact area. As a result, the auxiliary rib 60 is able to withstand premature wear.

As in this manner the auxiliary rib 60 undergoes reduced wear, the function of the auxiliary rib 60 to assist the dust sealing lip 56 in following the shaft eccentricity is sustained for a long period of time. Accordingly, the dust scraping action of the dust sealing lip 56 is maintained for a long period to effectively prevent ingress of dust and dirt.

The present inventors have conducted a comparative experiment wherein the shaft seal according to the invention and the conventional shaft seal were subjected to a slurry test. Each shaft seal was fixedly mounted to a testing instrument and a shaft wetted with a slurry was passed through the seal. The shaft was offset by 0.5 mm and was reciprocated through a stroke of 10 mm for a rate of 12 cycles per second. After 50 hours of operation, the amount of leakage of the slurry observed with the shaft seal according to the invention was 0.01 g, in contrast to 0.06 g encountered with the conventional shaft seal.

While the present invention has been described herein with reference to the specific embodiment thereof, it is contemplated that the present invention is not limited thereby and various changes and modifications may be made therein for those skilled in the art without departing from the scope of the invention.

What is claimed is:

1. In a shaft seal for sealing a reciprocable shaft with respect to a housing, said shaft seal including a rigid annular casing for fluid tightly mounting to said housing, an annular elastomeric fluid sealing member bonded at an axially outer end thereof to said casing and sealingly engageable with said shaft for sealing the oil side of the shaft, and an annular elastomeric dust sealing member bonded at an axially inner end thereof to said casing and sealingly engageable with said shaft for sealing the air side of the shaft, said dust sealing member having a dust sealing lip and an auxiliary rib located axially inwardly of said dust sealing lip, the improvement wherein said auxiliary rib is configured to present a rounded profile having the radius of curvature larger than the radius of curvature of said dust sealing lip to ensure that a lubricant film of adequate thickness is retained over the shaft to thereby sufficiently lubricate said auxiliary rib, wherein the radius of curvature in the profile of said auxiliary rib is about 0.5 mm.

2. A shaft seal according to claim 1, wherein the radius of curvature in the profile of said dust sealing lip is about 0.2 mm.

3. A shaft seal according to claim 1, wherein the portion of said dust sealing member extending axially outwardly of said auxiliary rib is configured to present a tapered outer profile.

4. In a shaft seal for sealing a reciprocable shaft with respect to a housing, said shaft seal including a rigid annular casing for fluid tightly mounting to said housing, an annular elastomeric fluid sealing member bonded at an axially outer end thereof to said casing and sealingly engageable with said shaft for sealing the oil side of the shaft, and an annular elastomeric dust sealing member bonded at an axially inner end thereof to said casing and sealingly engageable with said shaft for sealing the air side of the shaft, said dust sealing member having a dust sealing lip and an auxiliary rib located axially inwardly of said dust sealing lip, the improvement wherein said auxiliary rib is configured to present a rounded profile having the radius of curvature which is larger by about 0.2–0.3 mm than the radius of curvature of said dust sealing lip.

* * * * *